Feb. 5, 1935.  R. C. LAFFERTY, JR  1,989,870
VALVE
Filed Sept. 30, 1932

INVENTOR
ROBERT C. LAFFERTY JR.
BY
Clarence S. Ashley
ATTORNEY

Patented Feb. 5, 1935

1,989,870

UNITED STATES PATENT OFFICE 1,989,870

VALVE

Robert C. Lafferty, Jr., Charleston, W. Va.

Application September 30, 1932, Serial No. 635,468

3 Claims. (Cl. 251—130)

The invention relates to improvements in shut-off and ball check valves and has particular reference to a specially designed valve applicable for use in connection with the control of fluid ducts carrying volatile liquids such as gas, vapors, acids and in fact any form of fluid medium under varying pressures.

The object of the invention resides in the providing of a valve combining the functions of a manually operated cut off and check valve, operating with great efficiency with varying pressures, the cut off form being controlled manually and the check form of valve being automatic by reason of the structure employed to effect such results. The invention consists of a valve casing having a web core provided with a central chamber dividing said casing into inlet and exhaust chambers provided with apertured ends arranged to receive pipe connections, said casing at the ends of said central chamber having mounted therein a series of preferably two ball seat members, and a ball valve cage disposed on an inclined plane between said ball seat members and having a ball valve movably mounted therein, said casing having formed therewith a neck portion likewise disposed on an inclined plane arranged to receive the valve bonnet carrying the means for actuating the valve stem manually to effect the ball shut off form of valve structure.

By reason of the particular form of valve assembly the structure produces another and important object, namely that of a valve combining the desirable elements of a valve wherein fouling or stoppage is eliminated since the relative position of the operative parts thereof will not jam or clog the fluid passageways therein, it permits the passage of foreign substances therethrough, it provides a structure easily disassembled for repairs and one having a minimum of wearing parts that might be susceptible to rupture or temporary disorder, and a valve wherein all parts may be readily replaced with a minimum initial cost, thus producing a combination valve structure of highly efficient and economical value.

In the following there is described the general embodiment of the invention, the features thereof being clearly defined hereinafter in the claims.

Figure 1:
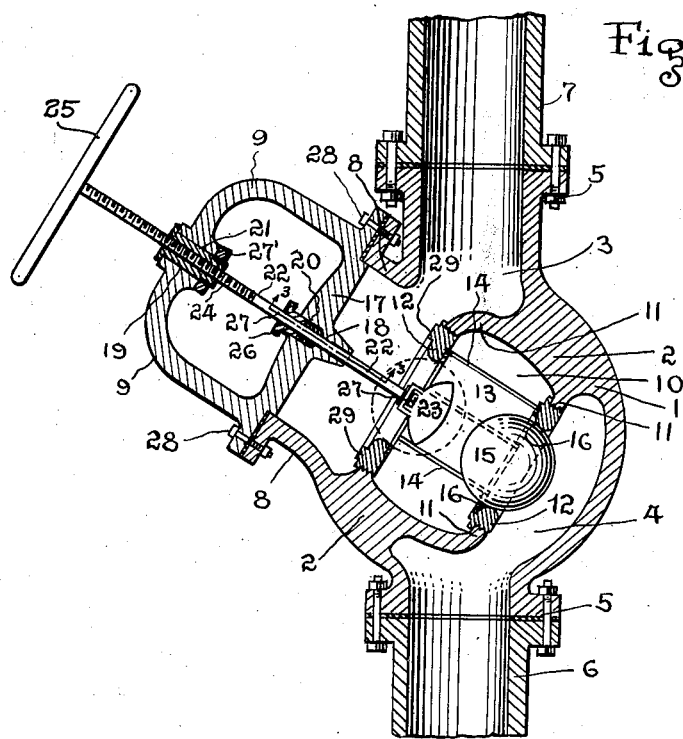
Figure 3:
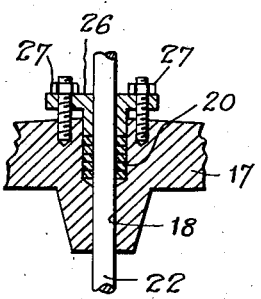
Figure 2:
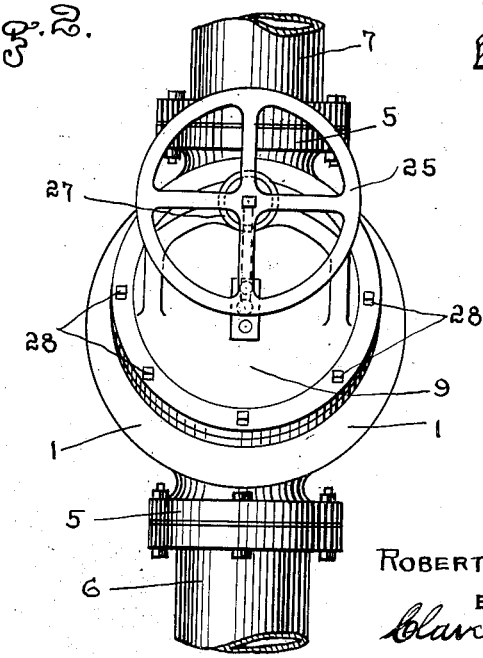

In the drawing, Fig. 1 is a vertical sectional view of the combination valve structure showing the operative parts thereof, Fig. 2 is a side elevation of the valve structure, and Fig. 3 is an enlarged fragmentary sectional view as on line 3—3, Fig. 1.

Similar numerals of reference indicate similar parts throughout the views of the drawing forming part hereof.

In the drawing, 1 designates generally a valve body or casing of the globular type provided with a central core portion 2 dividing said casing 1 into relative inlet chamber 4 and exhaust chamber 3, said casing 1 having bosses 5 flanged to permit bolting of pipes 6 and 7 with proper connections thereto, forming part of a fluid duct circulation system, and said casing 1 having integrally formed therewith an angularly disposed neck or boss 8 arranged to receive a bonnet 9 carrying the shut off valve actuating means.

Central portion 2 of casing 1 is cored out to form a chamber 10 disposed in an inclined plane, that is, angularly disposed to pipes 6 and 7 and chambers 3 and 4, and has formed therewith threaded circular ribs 11 arranged to receive the externally threaded members 12 having ball seats. 13 indicates a ball valve cage consisting preferably of a series of rods or wires 14 mounted in rings and resting between the respective ball seat members 12 to form such cage 13 wherein ball valve 15 is operative.

The ball seat members 12 are provided with annular seating surfaces as indicated at 16, the lower member 12 being adapted to seat the ball 15 for automatically checking or cutting off the flow of media through chamber 10 in a direction from outlet chamber 3 to inlet chamber 4, and for seating the ball 15 for cutting off flow in the opposite direction when the ball is manually forced against the seat.

Under certain conditions, it may be desirable to have the ball act as a cut-off valve by seating under fluid pressure, and accordingly the upper seat member 12 is adapted to selectively act as a seat for the ball 15 under fluid pressure to cut off flow through chamber 10 in the opposite direction, or from chamber 4 to chamber 3. Since ball seat members 12 are mounted as described, and as cage 13 fits between them, they dispose the cage 13 on a defined inclined plane or at a predetermined angle in order to produce the proper degree of angle to control the automatic seating of the ball, or in other words, the cage 13 is coaxial with the ball seats 16 on the members 12.

By reason of the fact that the surface of ball valve 15 is spherical in form for seating on the rings 12, there is substantially no chance of the valve functioning surfaces being clogged with foreign substances, nor can they in fact hold any substance that might impede the passage of fluids therethrough.

Bonnet 9 comprises a hooded casting having a lower web 17 apertured at 18 and the central upper portion thereof is also apertured at 19. The web 17 has mounted therein stuffing 20 and a bushing 21 is located in aperture 19 to receive valve stem 22 carrying at its extreme lower end a cupped partial sphere 23 for engagement and contact with ball valve 15 when functioning to allow passage of liquid, the upper portion of said stem 22 being threaded at 24 to engage the threads in bushing 21 and having mounted on the outer end thereof a hand wheel 25 for actuating purposes. Valve stem 22 has mounted thereon adjacent the point where it enters stuffing 20 a follower plunger 26 connected to web 17 by bolt 27 and arranged to compress stuffing 20 so as to permit no leakage of fluid around stem 22. Lock nut 27' is employed on bushing 21 to hold said bushing 21 firmly in place in bonnet 9. The valve 15 normally co-operates with the lower valve seat 16 and acts as a check valve, the valve stem 22 and cup 23 serving as a stop limiting the opening movement of the valve, the valve being adapted to be forced against the lower valve seat 16 by moving the stem 22 and cup 23 inwardly, to act as a cut-off valve, and when the stem 22 and cup 23 are sufficiently retracted the ball valve is adapted to be held seated by fluid pressure on the upper valve seat 16 of the upper ring 12 and close the flow of fluid through the valve chamber 10; in which latter case said valve stem 22 when manually actuated is adapted to unseat the valve from the upper valve seat to permit fluid flow through the valve.

Bonnet 9 is fastened to the reception end of the neck 8 of casing 1 by means of bolts 28 in order to provide accessible means for disconnecting such engaging parts thereof for the purpose of having access to the inner confines of casing 1 wherein upper and lower ball seat members 12 are provided with hexagonal or slotted heads 29 to permit of the insertion therein of a suitable tool for tightening, removing or the adjustment of the parts constituting both the ball check and shut off valve structure.

It is clear and quite obvious that the parts making up the structure as a whole may be varied in many ways without departing materially from the general spirit of the invention.

What is claimed and desired secured by Letters Patent of the United States, is:

1. A device of the character described comprising a valve casing having inlet and outlet ports, valve seat reception means formed therein, valve seats mounted therein on planes inclined with relation to said inlet and outlet ports, a valve chamber formed between said seat reception means, a valve operative in said chamber between said seats, a bonnet mounted on said casing, and a valve stem mounted therein arranged when retracted to permit said valve to function as a check valve and when moved inwardly to force said valve to seat on the lower valve seat to function as a cut-off valve.

2. A device of the character described comprising a valve casing having inlet and outlet ports, valve seat reception means formed therein, valve seats mounted therein on planes inclined with relation to said inlet and outlet ports, a valve chamber formed between said seat reception means, a valve operative in said chamber between said seats, a bonnet mounted on said casing, and a valve stem mounted therein arranged when retracted to permit said valve to function as a check valve and when moved inwardly to force said valve to seat on the lower valve seat to function as a cut-off valve, a valve guide mounted in said chamber, said valve being operative in said guide on a plane inclined to the axis of the inlet and outlet ports in said casing and said seats being disposed in said casing on planes perpendicular to the axis of said valve stem.

3. A device of the character described comprising a valve casing having inlet and outlet ports, valve seat reception means formed therein, valve seats mounted therein on planes inclined with relation to said inlet and outlet ports, a valve chamber formed between said seat reception means, a valve operative in said chamber between said seats, a bonnet mounted on said casing, and a valve stem mounted therein arranged when retracted to permit said valve to function as a check valve and when moved inwardly to force said valve to seat on the lower valve seat to function as a cut-off valve, a valve guide mounted in said chamber, said valve being operative in said guide on a plane inclined to the axis of the inlet and outlet ports in said casing and said seats being disposed in said casing on planes perpendicular to the axis of said valve stem, said bonnet and valve stem being detachable from said casing to permit of the adjustment and cleansing of the operative parts thereof.

ROBERT C. LAFFERTY, Jr.